United States Patent
Dalrymple et al.

(10) Patent No.: US 6,976,094 B1
(45) Date of Patent: Dec. 13, 2005

(54) AUTOMATED WEB BROWSER SYNCHRONIZATION BY USING SESSION INITIATION PROTOCOL DURING A REAL-TIME SESSION

(75) Inventors: William C. Dalrymple, Cary, NC (US); Ta-Ming Chen, Cary, NC (US); Steve McKinnon, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 728 days.

(21) Appl. No.: 09/666,583

(22) Filed: Sep. 21, 2000

Related U.S. Application Data
(60) Provisional application No. 60/203,146, filed on May 9, 2000.

(51) Int. Cl.[7] .............................................. G06F 15/16
(52) U.S. Cl. ...................... 709/248; 709/205; 709/227; 709/232; 719/313; 719/319; 719/328
(58) Field of Search ................................ 709/204, 205, 709/218, 221, 248

(56) References Cited

U.S. PATENT DOCUMENTS

| | | | | |
|---|---|---|---|---|
| 5,944,791 A | * | 8/1999 | Scherpbier | 709/218 |
| 5,978,842 A | * | 11/1999 | Noble et al. | 709/218 |
| 6,115,027 A | * | 9/2000 | Hao et al. | 345/858 |
| 6,434,222 B1 | * | 8/2002 | Shaffer et al. | 379/88.13 |
| 6,557,028 B2 | * | 4/2003 | Cragun | 709/205 |
| 6,571,245 B2 | * | 5/2003 | Huang et al. | 707/10 |
| 6,668,273 B1 | * | 12/2003 | Rust | 709/204 |
| 6,785,708 B1 | * | 8/2004 | Busey et al. | 709/204 |
| 2003/0061354 A1 | * | 3/2003 | Burg et al. | 709/227 |

OTHER PUBLICATIONS

Jacobs et al, "Filling HTML Forms Simultaneously: CoWeb—Architecture and Functionality", Fifth International world Wide Web Conference, May 1996, Paris, France.*

Woo et al., "A Synchronous Collaboration Tool for World Wide Web", Distributed Systems Technology Centre, the University of Qeensland, Queensland 4072, Australia.*

* cited by examiner

*Primary Examiner*—Hosain Alam
*Assistant Examiner*—Oanh Duong
(74) *Attorney, Agent, or Firm*—Withrow & Terranova, PLLC

(57) ABSTRACT

The present invention allows synchronization of web browsers to eliminate the need for users to convey uniform resource locators (URLs) or like location indicia. The invention operates with a local user's browser to identify the URL for a newly loaded web page and transmit this newly loaded URL to a remote user's computer for loading on the remote user's browser. Further, the invention also provides for receiving URLs associated with web pages loaded onto the remote user's browser and loading the web pages on the local user's browser using the received URLs.

33 Claims, 5 Drawing Sheets

AUTOMATED WEB BROWSER SYNCHRONIZATION BY USING SESSION INITIATION PROTOCOL DURING A REAL-TIME SESSION

This application claims the benefit of provisional application No. 60/203,146, filed May 9, 2000 under 35 U.S.C. Section 119(e).

FIELD OF THE INVENTION

The present invention generally relates to web browsers, and in particular, to automatically synchronizing multiple web browsers.

BACKGROUND OF THE INVENTION

Given the ever-increasing popularity of the Internet and the current state of network technology, both leisure and business users often desire to share and view web pages with one another. Although today's desktop software makes it very easy to email a web page or the web page's uniform resource locater (URL) to one or more parties, the process is relatively slow and undesirable when the parties are engaged in a voice call or real-time, online messaging session. During these sessions, there is currently no way to synchronize the browsers for all of the users party to the call.

Often, users engaged in a real-time communication session are forced to relay a URL to another user, who must retype the desired URL. Verbal communication of web addresses is fraught with misinterpretation and misunderstanding of the URL. Further, relaying and typing URLs during voice or real-time messaging sessions is subject to typographical errors. Alternatively, emailing URLs during communication sessions is very slow and inhibiting. As such, there is a need for a technique that provides for efficiently updating all of the users' web browsers when any one of the users accesses a new web page.

SUMMARY OF THE INVENTION

The present invention allows synchronization of web browsers to eliminate the need for users to convey uniform resource locators (URLs) or like location indicia. The invention operates with a local user's browser to identify the URL for a newly loaded web page and transmit this newly loaded URL to a remote user's computer for loading on the remote user's browser. Further, the invention may also provide for receiving URLs associated with web pages loaded onto the remote user's browser and loading the web pages on the local user's browser using the received URLs.

Preferably, a web browser interface device interacts with the browser to receive URLs originally selected by the local user and forward these URLs to the remote user. Similarly, the web browser interface device receives URLs from the remote user and controls the local browser to load the web page based on the URL from the remote user. The web browser interface device also facilitates communication with and between other web browser interface devices to facilitate the transport of URL or like location indicia between the devices. Preferably, the web browser interface device interacts with the associated browser through a standard application protocol interface (API) and facilitates communications between the devices using the session initiation protocol (SIP). Further, the invention may be configured to allow a local user to selectively accept the automatic loading of a web page associated with the URL sent from the remote user. Likewise, the local user may selectively forward the URL associated with newly loaded web pages. The present invention is well-suited to operate in conjunction with a voice call between the users wherein the respective computers are engaged in a communication session. The URL information may be sent separately from or integrated with voice data during the call. Further, the voice communication may occur over the public switched telephone network or a packet-switched network, such as the Internet. If the voice call is implemented via the users' computers, the URL information may be integrated with the voice call.

Those skilled in the art will appreciate the scope of the present invention and realize additional aspects thereof after reading the following detailed description of the preferred embodiments of the invention in association with the accompanying drawing figures.

BRIEF DESCRIPTION OF THE DRAWING FIGURES

Reference will now be made in detail to the preferred embodiments of the present invention, examples of which are illustrated in the accompanying drawings, wherein like numerals indicate the same elements throughout the several views.

DETAILED DESCRIPTION OF THE PREFERRED EMBODIMENTS

The present invention relates to synchronizing two or more web browsers by automatically pushing and receiving web content between two or more computers engaged in a communication session. Once a session between two or more computers is established, any user may easily and automatically share the current web page that they are viewing with all other users engaged in the session. When the other users receive a URL or other location indicia for the web page, they can have their local web browser automatically load the web page, or optionally, interact with a user interface to choose whether or not to load the web page.

The invention is particularly useful when combined with a voice call using techniques as described in pending application Ser. No. 09/164,885, entitled "Method and Apparatus for Integrated Multimedia Call Control," filed Oct. 1, 1998, and Ser. No. 09/065,124, entitled "Integrated Telecommunication Collaboration System," filed Apr. 23, 1998, which are incorporated herein by reference. When users are engaged in a voice call or messaging session, the present invention provides the ability to share web pages, URLs, or other web content between computers during the call with no additional setup required other than establishing the call. The invention is equally useful outside of a voice or messaging session, wherein users may synchronize their browsers in the absence of other communications. Even though the preferred embodiment of the invention as described below identifies specific protocols and software technologies, those skilled in the art will recognize numerous protocols and related technologies that exist and that will be developed that are capable of carrying out the inventive concepts described herein.

Preferably, the present invention is implemented in a manner readily compatible with existing browser applications, such as Microsoft's Internet Explorer and Netscape's Communicator. These and other widely available browsers support application protocol interfaces (APIs) that allow external software applications to control the functions of a local browser running on the same computer. The API provided by the browsers supports the ability to notify external applications of URL updates and allows external applications to automatically control the loading of web pages by the browser. Since most web browsers are configured to allow external programs to control their operation, the preferred embodiment of the present invention incorporates a software application called a web browser interface device (WBID), which is configured to cooperate with the web browser through an API.

Figure 1:
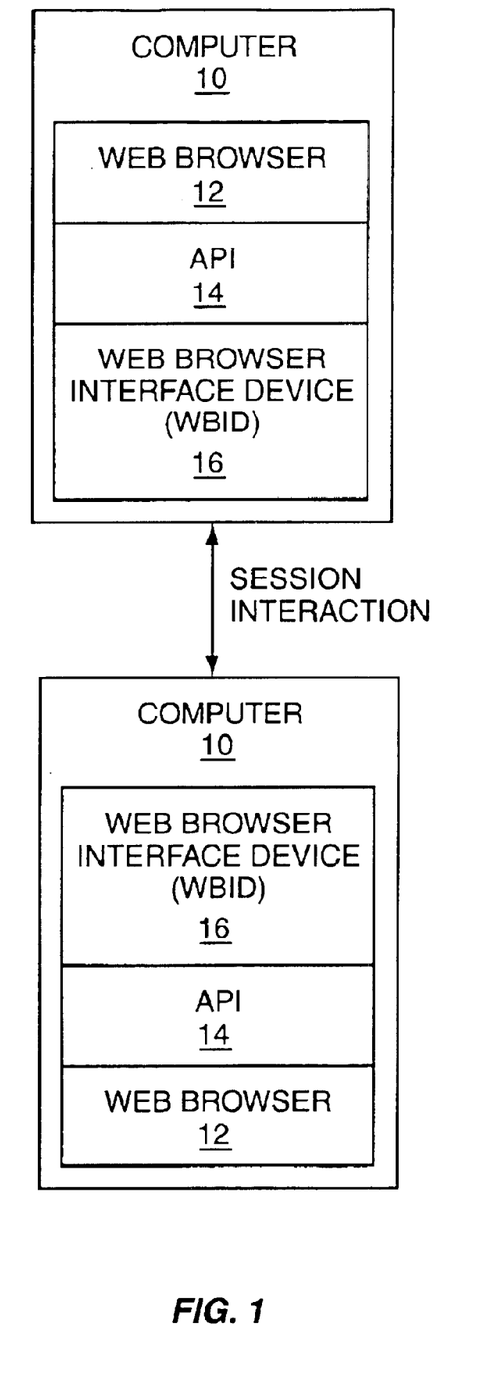
FIG. 1 is a block representation of an architecture for providing web browser synchronization according to a preferred embodiment of the present invention.

Turning now to FIG. 1, a block representation of two computers 10 engaged in a session according to the present invention is depicted. The computers may communicate over any type of network, such as a packet-switched network supporting the TCP/IP protocol suite. Preferably, each computer 10 will include a web browser 12 having an API 14 cooperating with a WBID 16. The WBID 16 can provide two important functions. The first is to interact with the associated web browser 12, and the second is to establish sessions with other WBIDs 16 or compatible browsers running on remote computers 10. The API 14 used by the preferred embodiment of the present invention is Microsoft's Dynamic Data Exchange (DDE) API available on all Windows-based platforms. A DDE API provides the ability for Windows-based applications to dynamically exchange information. For example, DDE may allow a spreadsheet application to dynamically exchange information with a word processor to ensure that the corresponding document contains up-to-date information. Although there are a number of automation APIs that provide the same capability, such as Microsoft's COM interfaces, most browsers support the DDE API. Dynamic Data Exchange documentation is readily available throughout the software industry and from Microsoft Corporation, Redmond, Wash. The interaction between the WBID 16 and the web browser 12 using a DDEbased API 14 is described in further detail below.

Preferably, each WBID 16 has the ability to establish a session with other WBIDs 16 over a data network transport of any type. There are numerous protocols for establishing these types of sessions and any of them are sufficient as long as they are capable of communicating information from one user to another according to the concepts described herein. The preferred embodiment of the invention uses the session initiation protocol (SIP) as described in the Internet Engineering Task Force's (IETF) RFC2543, which is incorporated herein by reference in its entirety.

The WBID may establish sessions using any number of techniques as will be apparent to those of ordinary skill in the art. With respect to the present invention, it is important that once a session is established, URL information or like web page location indicia can be passed between the WBIDs 16 of the various computers 10 engaged in a session. Prior to describing the details of web synchronization, two exemplary techniques for establishing sessions between computers 10 using SIP are provided.

Establishing a session between two computers 10 using SIP requires an SIP invitation consisting of two requests, an INVITE request followed by an acknowledgment (ACK) message. The INVITE request asks a "callee" to join or engage in a session with a "caller." The session may be a conference with multiple users or a simple, two-party session. After the callee agrees to participate in a call, the caller confirms that it has received response by sending the ACK message. When the caller desires to end the session, a BYE request is sent to the callee.

The INVITE request will typically contain a session description providing the callee with sufficient information to join the session. For multi-cast sessions, such as those used in conferencing, the session description defines the media types and formats that may be used or otherwise distributed in the session.

Figure 2:
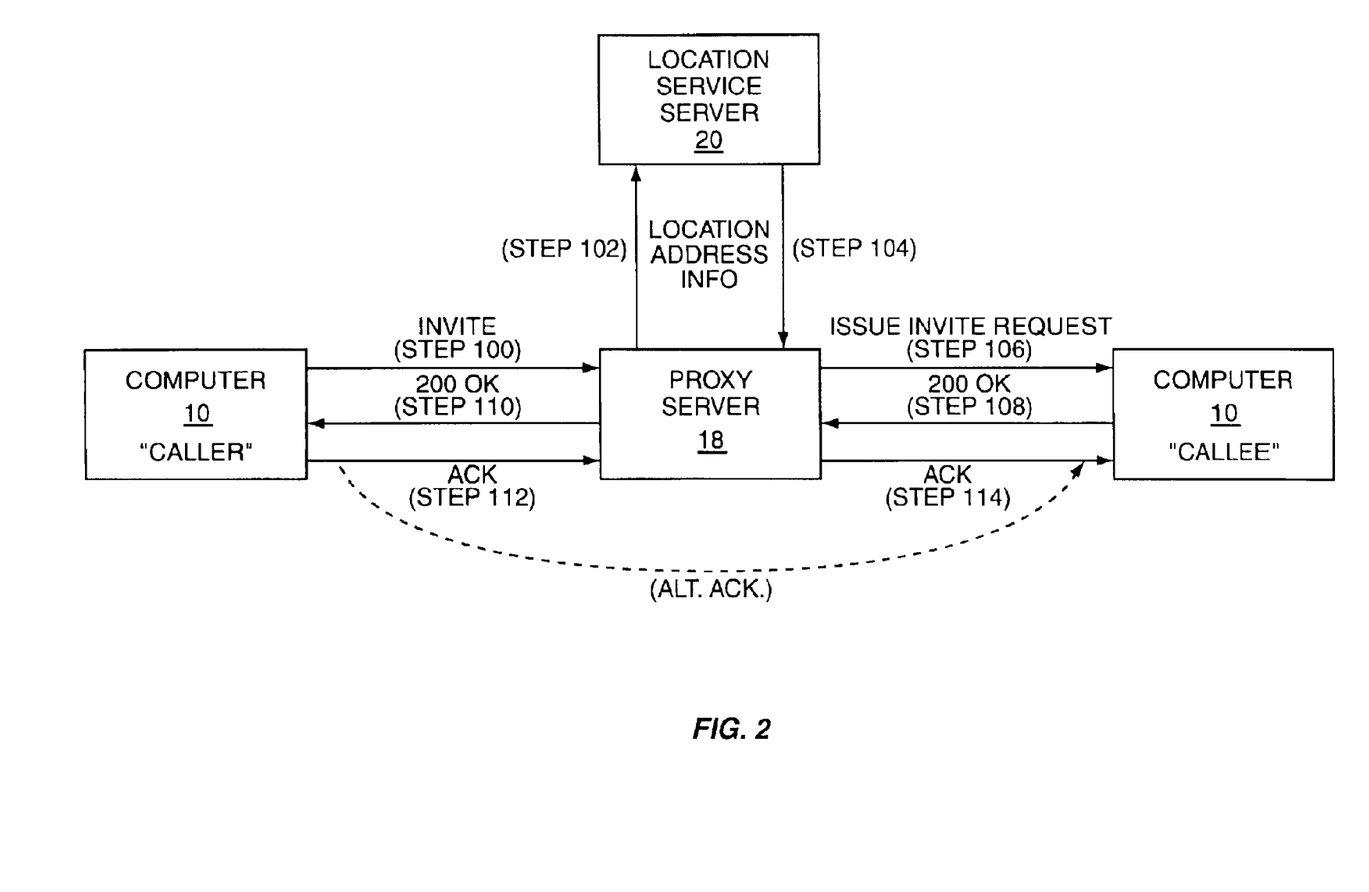
FIG. 2 is a block representation outlining the process of establishing a session between a caller and a callee according to a first embodiment of the present invention.
Figure 3:
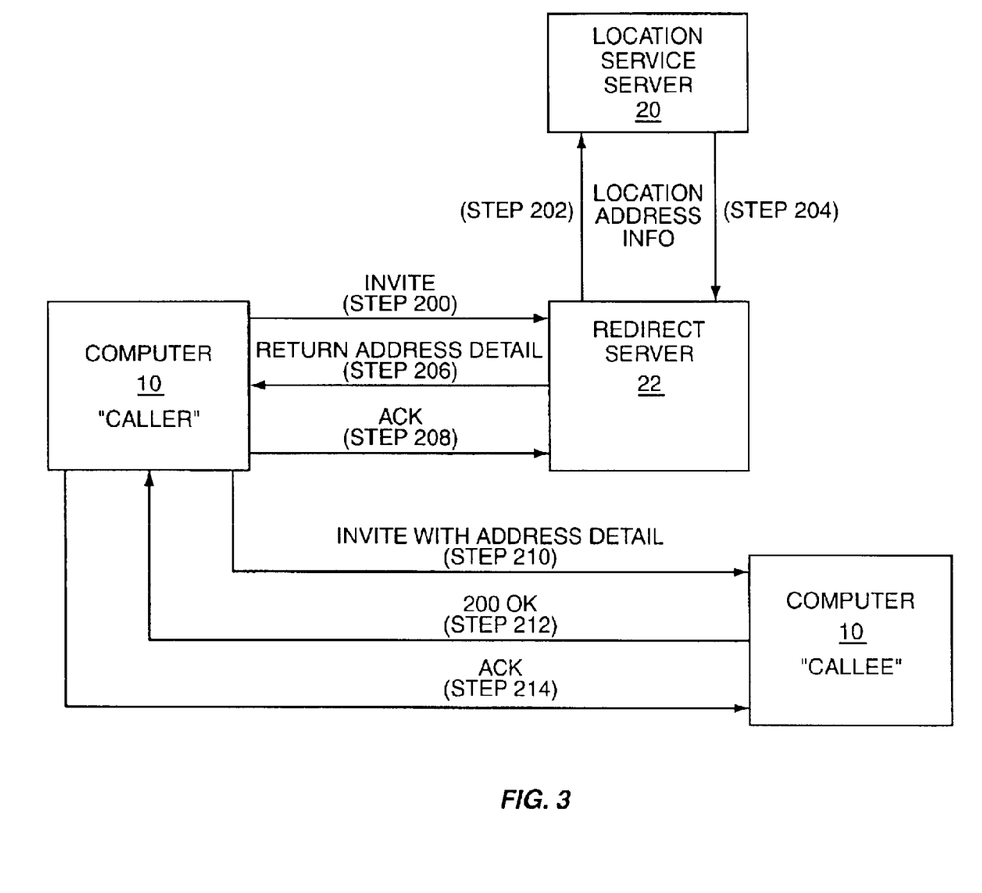
FIG. 3 is a block representation outlining the process of establishing a session between a caller and a callee according to a second embodiment of the present invention.

The protocol for session initiation using SIP is shown in FIG. 2 for a proxy server and FIG. 3 for a redirect server. In FIG. 2, a proxy server 18 accepts the INVITE request from a caller computer 10 (step 100) and contacts a location service server 20 with all or part of the caller's address to determine specific address information for the invited callee computer 10 (step 102). The location service server 20 will process the information and return a specific address identifying the callee computer 10 to the proxy server 18 (step 104). The proxy server 18 will then issue an INVITE request to the callee computer 10 based on the specific address returned by the location service server 20 (step 106).

Notably, for a conference session where there are multiple callees, the proxy server 18 will send INVITES to each of the callee computers 10 based on addresses received from the location service server 20 as necessary. A user agent server running on the callee computer 10 will alert the callee that a session is being requested, and if the session is accepted by the callee, return a success indication (200 OK) to the proxy server 18 (step 108). The proxy server 18 will relay the indication to the caller computer 10 (step 110). Receipt of this indication by the caller computer 10 will result in sending an ACK message to the proxy server 18 (step 112), which will forward the ACK message to callee computer 10 (step 114). Alternatively, the ACK message may be sent directly to the callee computer 10. Throughout the session, the request and responses will typically have the same session or call identification.

Session establishment using a redirect server 22 is shown in FIG. 3. Initiation begins when the caller computer 10 sends an INVITE request to the redirect server 22 (step 200), which contacts the location service server 20 to obtain the specific address for the callee computer 10 (steps 202 and 204). Instead of contacting the callee computer 10 directly as described above with the proxy server 18, the redirect server 22 in this embodiment returns the specific address information to the caller computer 10 (step 206). The caller computer 10 then sends an ACK message to the redirect server 22 to indicate receipt of the callee computer's address (step 208) and proceeds to initiate a session with the callee computer 10 directly.

The caller computer 10 issues a new INVITE request to the address returned by the redirect server 22 (step 210). Similarly, the user agent server running on the callee computer 10 will inform the callee that a session is being initiated, and assuming the session is accepted by the callee, the user agent server will send an acceptance message (200 OK) to the caller computer 10 (step 212). The caller computer 10 will respond with an ACK message to the callee computer 10 to finalize session establishment (step 214).

To facilitate web synchronization according to the preferred embodiment of the present invention, users engaged in a session allowing web synchronization will have a WBID 16 and web browser 12 running on their computer 10. The WBID 16 will initially instantiate itself as a DDE server and define a callback method that will receive and process DDE information received from the web browser 12 via the API 14. Preferably, the WBID 16 will access the application registry for the computer 10 and determine which browser is registered as the default web browser. The WBID 16 will then instruct the default web browser 12 to inform the WBID 16 of URLs for web pages loaded by the web browser 12. This may be accomplished by opening a DDE connection and transaction via API 14 with the DDE topic of "WWW_RegisterURLEcho." The web browser 12 will preferably only send URLs for web pages that are selected by the user and not those loaded in response to receiving a URL from a remote user. The web browser 12 is now configured to alert the WBID 16 via the API 14 any time a new web page is loaded by the web browser 12.

In operation, a "caller" establishes a session with a "callee" and passes the currently loaded URL to the callee's WBID 16. Preferably, this is accomplished with an SIP INVITE message wherein the URL information is passed using Multipurpose Internet Message Extensions (MIME). MIME defines a technique whereby an object can contain a reference or pointer to data rather than having to contain the data itself. This system is embodied in the text/uri-list media type defined in the Internet Engineering Task Force's RFC1521, which is incorporated herein by reference in its entirety. In essence, MIME is a defined way to label items to make them more amenable to correct handling.

The WBID 16 of the callee acknowledges the INVITE request by sending a "200 OK" response message back to the caller. The WBID 16 for the caller sends an ACK message, as described above, and the session is established wherein the URL currently loaded by the caller's web browser 12 is available to the callee's web browser 12. Any time either the caller or the callee traverses their web browser 12 to a new web page, the corresponding web browser 12 will notify the WBID 16 application via the API 14 with a DDE client transaction using the topic of "WWW_EchoURL" and pass the currently loaded URL to the other WBID(s) 16 participating in the session. Any WBID 16 receiving the update will pass the URL to the corresponding web browser 12 via the API 14 wherein the web browser 12 will load the web page corresponding to the URL.

Preferably, this is done in an SIP environment by sending a re-INVITE with the URL information being the only change from the initial INVITE request. When a re-INVITE request is received, the WBID 16 receiving the re-INVITE will parse the URL information and either make the user aware that a new URL is being suggested from another user or automatically load the suggested URL. Whether the user is queried to load the URL or the URL is automatically loaded into the web browser 12 is preferably pre-configured by the user or automatically pre-configured when the session is initiated.

The WBID 16 can automatically load the suggested URL by issuing a DDE request of "WWW_OpenURL," which instructs the web browser 12 to automatically load URLs received via the API 14 from the WBID 16. If the web browser 12 is not already opened, the WBID 16 may use the Win32 DLL function called "shell_execute" to launch the web browser 12. The web browser 12 receiving the URL will load and display the corresponding web page so that the caller and callee are synchronized to the same web page.

Figure 4:
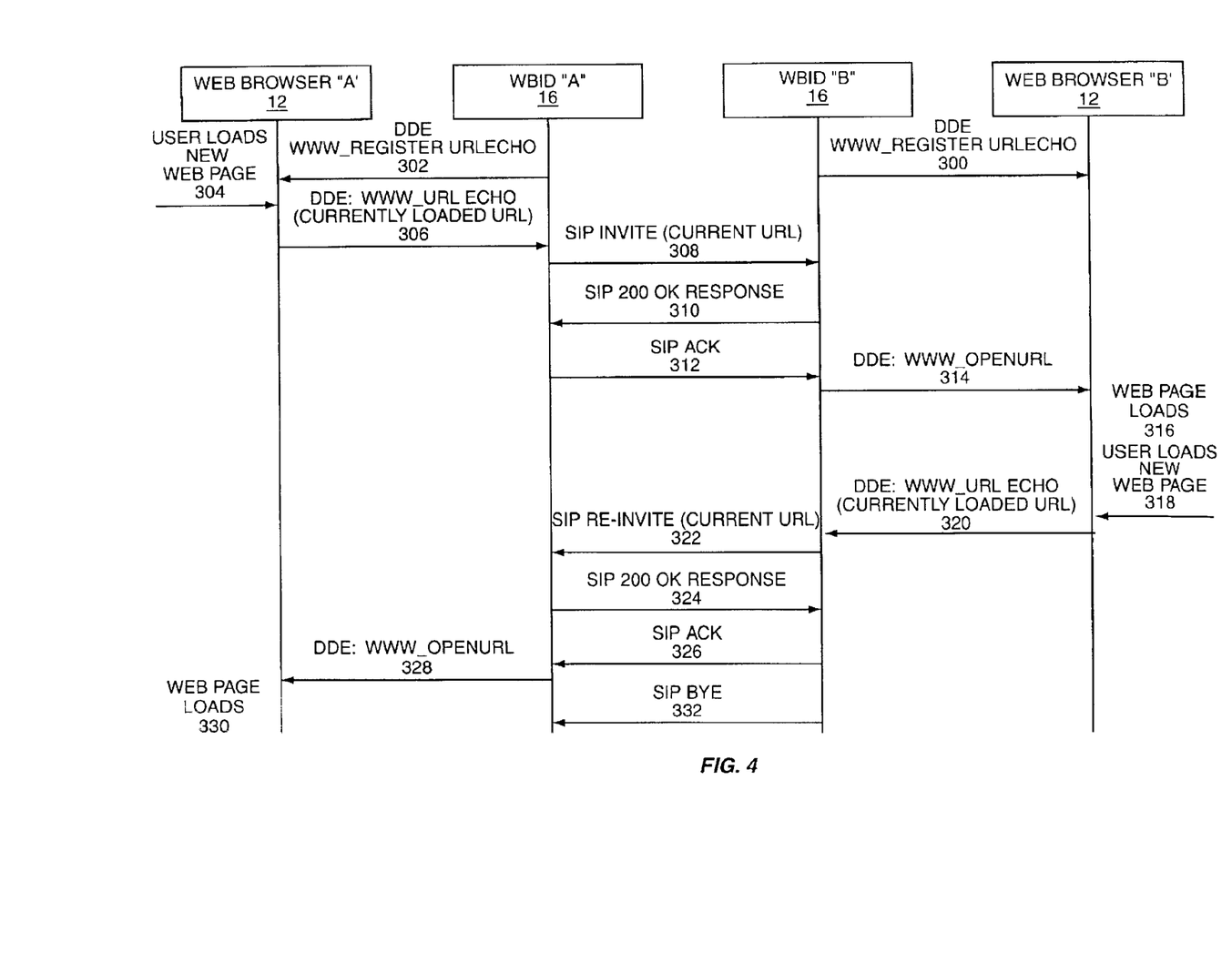
FIG. 4 is a flow diagram outlining a browser synchronization process according to a preferred embodiment of the present invention.

The flow diagram of FIG. 4 details a typical session between two users. Assume that web browser A and WBID A are the web browser 12 and WBID 12, respectively, running on user A's computer 10. Similarly, assume web browser B and WBID B are the web browser 12 and WBID 16, respectively, running on user B's computer. Initially, WBID A and WBID B register for URL updates with web browser A and web browser B, respectively, using the DDE topic of "WWW_RegisterURLEcho" (steps 300 and 302). When user A loads a new web page on web browser A (step 304), web browser A notifies WBID A of the currently loaded URL (step 306). If a session has not been initiated between user A and user B, WBID A establishes a session with WBID B, preferably using SIP, by sending an INVITE request containing the current URL to WBID B (step 308). The WBID B will respond with a 200 OK response (step 310), which will trigger the WBID A to send an ACK message to the WBID B (step 312).

At this point, there is an active session between the WBID A and the WBID B. Further, the WBID B has an INVITE request containing the URL of the web page loaded on web browser A. WBID B will parse out the URL from the INVITE request and request web browser B to load the suggested URL by sending the DDE topic of "WWW_OpenURL" with the URL to web browser B (step 314). This request may be an instruction to automatically load the URL or a query to the user as to whether or not to load the URL. In the latter case, the web browser will load the URL only if approved by the user (step 316).

Assuming that the web page for the received URL is automatically loaded or the user accepts the suggested URL, web browsers A and B will contain the same web page associated with the URL. Now assume that the user B is the next party to select a new web page to load (step 318). At this moment, web browser B notifies the WBID B through the API 14 of the newly loaded web page by providing the URL associated with the web page using a DDE topic of "WWW_EchoURL" (step 320). The WBID B will send a re-INVITE to the WBID A to identify the loading of the new web page at web browser B (step 322). The re-INVITE request results in the WBID A responding with a 200 OK (step 324), which causes the WBID B to respond with an ACK message (step 326).

The WBID A will then parse out the accompanying URL from the re-INVITE request and instruct the web browser A to load the suggested URL via the API 14 using the DDE topic of "WWW_OpenURL" (step 328). At this point, the web browser A will automatically load the web page associated with the URL or query the user A as to whether or not to load the web page (step 330). This process will continue as the users traverse from one web page to another until one of the users elects to end the session wherein the corresponding WBID will send a BYE request to the other WBID(s) to end the session (step 332).

Importantly, most of the description is focused on the session between two users, but those skilled in the art will recognize the concepts are equally applicable to multi-user sessions where anyone or all of the computers in the session will track and provide current URL information. Notably, in a conference setting it may be preferable to define a conference leader wherein other computers in the session will track the pages loaded by the leader. The remaining parties may be allowed to load new pages; however, changes by the remaining parties will not be sent to the leader or others in the conference. Alternatively, changes by the receiving parties may be sent wherein the other parties are given the option to load the corresponding web page. Those skilled in the art will recognize the multiple combinations of implementing the present invention in two party sessions as well as conference settings including more than two parties.

Figure 5:
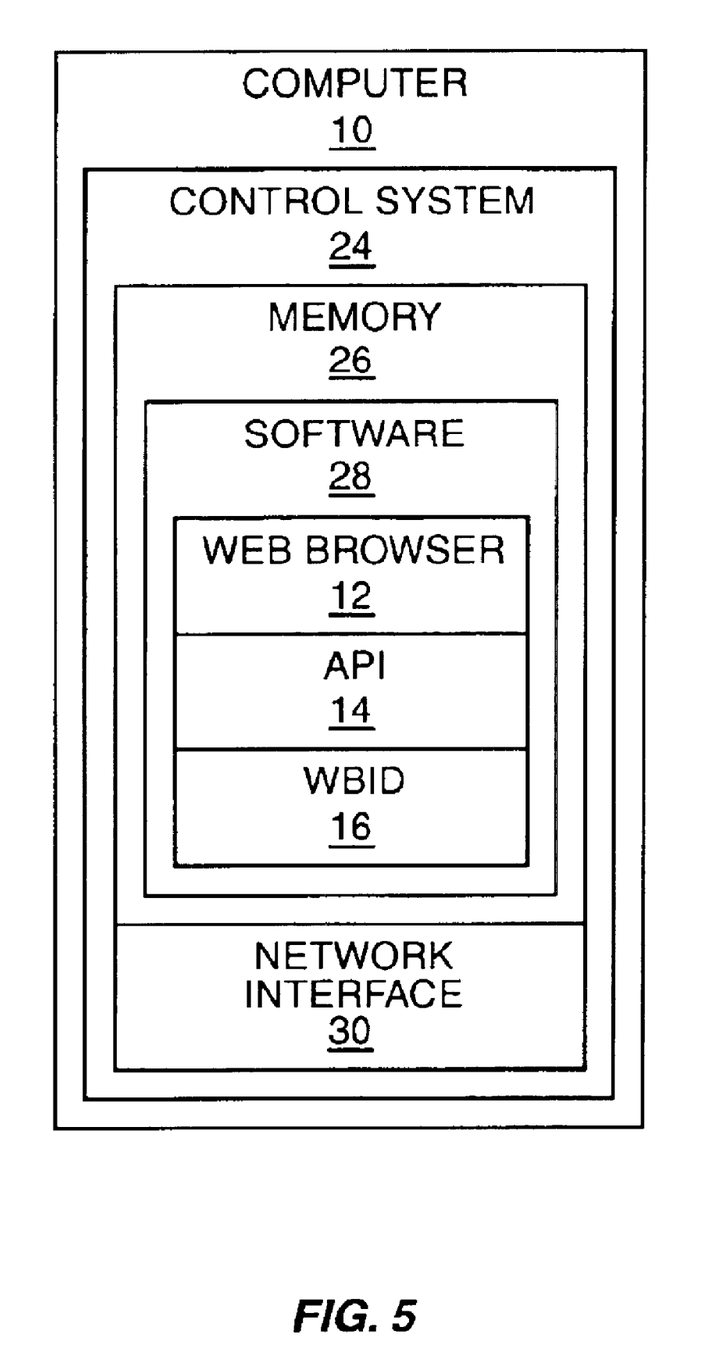
FIG. 5 is a block representation of a computer according to the present invention.

As shown in FIG. 5, the web browser 16 may run on any type of computer having a control system 24 associated with memory 26 having the requisite software 28 to provide the web browser 12, API 14 and the WBID 16. The control system 24 is associated with a network interface 30 to facilitate communications across the network to communicate with the other computers 10. Those skilled in the art will also recognize that the functionality of the WBID 16 may be incorporated totally within the web browser 12 and not have to be a stand alone application, object or hardware device interacting with the web browser 12 through the API 14.

As noted, the specific protocols in the software configuration may vary based on the desired design and implementation. The primary purpose of the invention is to allow users to easily share the current web page that they are viewing with others. When a user receives a suggested URL or like location indicia, they can have the web page automatically loaded at their browser or optionally interact with the interface to manually load the web page as desired. The invention eliminates the need to email, vocally repeat, or type web page addresses numerous times while in a session with other users. Those skilled in the art will recognize various modifications to the present invention within the concepts disclosed herein. These concepts are considered part of this disclosure and within the scope of the claims that follow.

What is claimed is:

1. A computer readable media containing software for facilitating synchronization of web browsers, said software comprising instructions for a computer to:
    automatically identify first location indicia for a first web page loaded by an associated browser during a real-time communication session;
    send the first location indicia for the first web page over a network for loading on a remote browser running on a remote computer as part of the real-time communication session;
    receive second location indicia for a second web page loaded by the remote browser running on the remote computer;
    load the second web page on the associated browser based on the second location indicia for the second web page;
    incorporate the first location indicia for the first web page in a first invite message wherein the instructions to send the first location indicia for the first web page over the network send the first invite message to the remote computer using session initiation protocol;
    wherein the instructions to receive the second location indicia for the second web page over the network include instructions to receive a second invite message from the remote computer, thereby forming a received invite message; and
    remove the second location indicia for the second web page from the received invite message.

2. The computer readable media of claim 1 further comprising instructions to:
    query a user of the associated browser whether to send the first location indicia for the first web page for loading on the remote browser;
    receive a response to the query; and
    if the response is affirmative, send the first location indicia for the first web page for loading on the remote browser.

3. The computer readable media of claim 1 further comprising instructions to:
    upon receiving the second location indicia for the second web page, query the user of the associated browser whether to load the second web page;
    receive a response to the query; and
    if the response is affirmative, effect loading of the second web page on the associated browser.

4. The computer readable media of claim 1 further comprising instructions to send the first location indicia for the first web page over the network for loading on a plurality of remote browsers.

5. The computer readable media of claim 1 further comprising instructions to configure the associated browser to provide the first location indicia for the first web page upon loading the first web page.

6. The computer readable media of claim 1 wherein said real-time communication session comprises a voice call.

7. The computer readable media of claim 1 further comprising instructions to implement the associated browser wherein the associated browser is configured for web browser synchronization.

8. A computer readable media containing software for implementing a web browser interface device facilitating synchronization of web browsers, said software comprising instructions for a computer to:
    receive from an associated browser first location indicia for a first web page loaded by the associated browser, thereby forming received location indicia;
    send the first location indicia for the first web page over a network for loading on a remote browser running on a remote computer;
    receive second location indicia for a second web page loaded by the remote browser running on the remote computer;
    instruct the associated browser to load the second web page on the associated browser based on the second location indicia for the second web page;
    incorporate the received location indicia for the first web page in a first invite message wherein the instructions to send the first location indicia for the first web page over the network send the first invite message to the remote computer using session initiation protocol;
    wherein the instructions to receive the second location indicia for the second web page over the network include receiving a second invite message from the remote computer, thereby forming a received invite message; and
    remove the second location indicia for the second web page from the received invite message.

9. The computer readable media of claim 8 further comprising instructions to:
    configure the associated browser to provide location indicia for a web page for sending to the remote browser, the web page initially selected by a user of the associated browser and loaded by the associated browser; and
    configure the associated browser to receive and load the web page initially selected by a user of the remote browser upon receiving the location indicia for the web page initially selected by the user of the remote browser;

wherein the first web page is a web page initially selected by the user of the associated browser and the second web page is a web page initially selected by a user of the remote browser.

10. The computer readable media of claim 8 wherein interaction with the associated browser is conducted via an application protocol interface.

11. The computer readable media of claim 8 further comprising instructions to interact with an associated operating system to affect an application protocol interface server.

12. A computer readable media containing software for implementing a web browser interface device facilitating synchronization of web browsers, said software comprising instructions for a computer to:

during a real-time communication session;
interact with an associated browser to receive a first uniform resource locator for a first web page initially selected to load by a user of the associated browser thereby forming a first received uniform resource locator;
forward the first uniform resource locator for the first web page across a network to load on a remote browser as part of the real-time communication session;
receive a second uniform resource locator for a second web page selected by a remote user to load on the remote browser thereby forming a second received uniform resource locator;
effect loading of the second web page upon receiving the second uniform resource locator for the second web page;
incorporate the first received uniform resource locator for the first web page in a first invite message wherein the instructions to forward the first uniform resource locator for the first web page across the network send the first invite message to a remote computer using session initiation protocol;
wherein the instructions to receive the second uniform resource locator for a second web page include receiving a second invite message from the remote computer, thereby forming a second received invite message; and
remove the second uniform resource locator for the second web page from the second received invite message.

13. The computer readable media of claim 12 wherein said real-time communication session comprises a voice call.

14. The computer readable media of claim 13 wherein the real-time communication session is established with a web interface device running in association with the remote browser on the remote computer.

15. The computer readable media of claim 13 wherein the real-time communication session is established with the remote browser on the remote computer.

16. The computer readable media of claim 12 further comprising instructions to:

query the user of the associated browser whether to send the first uniform resource locator for the first web page for loading on the remote browser;
receive a response to the query; and
if the response is affirmative, send the first uniform resource locator for the first web page for loading on the remote browser.

17. The computer readable media of claim 12 further comprising instructions to:

upon receiving the second uniform resource locator for the second web page, query the user of the associated browser whether to load the second web page;
receive a response to the query; and
if the response is affirmative, effect loading of the second web page by the associated browser.

18. The computer readable media of claim 12 further comprising instructions to send the first uniform resource locator for the first web page over the network for loading on a plurality of remote browsers.

19. A system for facilitating synchronization of web browsers comprising a central processing unit and a network interface providing for communications with a remote computer over a network, said central processing unit adapted to:

run a local browser configured to download web pages based on location indicia during a real-time communication session; and
obtain first location indicia for a first web page loaded by the local browser;
send the first location indicia for the first web page over the network for loading on a remote browser running on the remote computer as part of the real-time communication session;
receive second location indicia for a second web page loaded by the remote browser running on the remote computer;
load the second web page on the local browser based on the second location indicia for the second web page;
incorporate the first location indicia for the first web page in a first invite message;
wherein said central processing unit adapted to send the first location for the first web page over the network is adapted to send the first invite message to the remote computer using session initiation protocol;
wherein said central processing unit adapted to receive the second location indicia for the second web page over the network is adapted to receive a second invite message from the remote computer, thereby forming a received invite message;
remove the second location indicia for the second web page from the received invite message.

20. The system of claim 19 wherein said central processing unit is further adapted to:

query a user of the system whether to send the first location indicia for the first web page for loading on the remote browser;
receive a response to the query from the user; and
if the response is affirmative, send the first location indicia for the first web page for loading on the remote browser.

21. The system of claim 19 wherein said central processing unit is further adapted to:

upon receiving the second location indicia for the second web page, query a user of the system whether to load the second web page;
receive a response to the query from the user; and
if the response is affirmative, effect loading of the second web page by the local browser.

22. A system for facilitating synchronization of web browsers comprising a central processing unit and a network interface providing communication with remote computers over a network, said central processing unit adapted to:

during a real-time communication session;
run a local browser configured to download web pages based on location indicia, and run a browser interface device configured to:
obtain from the local browser first location indicia for a first web page loaded by the local browser, the first web page initially selected by a user of the local browser;

send the first location indicia for the first web page over the network for loading on a remote browser running on a remote computer as part of the real-time communication session;

receive second location indicia for a second web page loaded by the remote browser running on the remote computer;

instruct the local browser to load the second web page based on the second location indicia for the second web page;

incorporate the first location indicia for the first web page in a first invite message wherein said browser interface device is adapted to send the first invite message to the remote computer using session initiation protocol;

receive a second invite message from the remote computer, thereby forming a received invite message; and remove the second location indicia for the second web page from the received invite message.

23. The system of claim 22 wherein said central processing unit is further adapted to:

query the user of the system whether to send the first location indicia for the first web page for loading on the remote browser;

receive a response to the query from the user; and if the response is affirmative, send the first location indicia for the first web page for loading on the remote browser.

24. The system of claim 22 wherein said central processing unit is further adapted to:

upon receiving the second location indicia for the second web page, query the user of the system whether to load the second web page;

receive a response to the query from the user; and if the response is affirmative, effect loading of the second web page by the local browser.

25. A method facilitating synchronization of web browsers comprising:

automatically identifying first location indicia for a first web page loaded by a local browser during a real-time communication session;

sending the first location indicia for the first web page over a network for loading on a remote browser running on a remote computer as part of the real-time communication session;

receiving over the network second location indicia for a second web page loaded by the remote browser running on the remote computer;

effecting loading of the second web page on the local browser based on the second location indicia for the second web page;

incorporating the first location indicia for the first web page in a first invite message;

sending the first invite message to the remote computer using session initiation protocol;

receiving a second invite message from the remote computer, thereby forming a received invite message; and removing the second location indicia for the second web page from the received invite message.

26. The method of claim 25 further comprising:

querying a user of the local browser whether to send the first location indicia for the first web page for loading on the remote browser;

receiving a response to the query; and if the response is affirmative, sending the first location indicia for the first web page for loading on the remote browser.

27. The method claim 25 further comprising:

upon receiving the second location indicia for the second web page, querying a user of the local browser whether to load the second web page;

receiving a response to the query; and if the response is affirmative, effecting loading of the second web page on the local browser.

28. The method of claim 25 further comprising sending the first location indicia for the first web page over the network for loading on a plurality of remote browsers.

29. The method of claim 25 wherein the real-time communication session comprises a voice call.

30. A method facilitating synchronization of web browsers comprising;

receiving from a local browser first location indicia for a first web page loaded by an associated browser during a real-time communication session;

sending the first location indicia for the first web page over a network for loading on a remote browser running on a remote computer as part of the real-time communication session;

receiving second location indicia for a second web page loaded by the remote browser running on the remote computer;

instructing the local browser to load the second web page on the local browser based on the second location indicia for the second web page;

incorporating the first location indicia for the first web page in a first invite message;

sending the first invite message to the remote computer using session initiation protocol;

receiving a second invite message from the remote computer, thereby forming a received invite message; and removing the second location indicia for the second web page from the received invite message.

31. The method of claim 30 further comprising:

configuring the local browser to provide location indicia for a web page for sending to the remote browser, the web page initially selected by a user of the associated browser and loaded by the local browser; and configuring the associated browser to receive and load the web page initially selected by the user of the remote browser upon receiving the location indicia for the web page initially selected by the user of the remote browser;

wherein the first web page is a web page initially selected by the user of the local browser and the second web page is a web page initially selected by a user of the remote browser.

32. A method facilitating synchronization of web browsers comprising:

interacting with a local browser to receive a first uniform resource locator for a first web page initially selected to load by a user of the local browser during a real-time communication session;

forwarding the first uniform resource locator for the first web page across a network to load on a remote browser as part of the real-time communication session;

receiving a second uniform resource locator for a second web page selected by a remote user to load on the remote browser;

effecting loading of the second web page after receiving the second uniform resource locator for the second web page;

incorporating the first uniform resource locator for the first web page in a first invite message;

wherein forwarding the first uniform resource locator for the first web page across the network includes forwarding the first invite message to the remote computer using session initiation protocol;

wherein receiving the second uniform resource locator for the second web page over the network includes receiving a second invite message from the remote computer; and removing the second-uniform resource locator for the second web page from the second invite message.

33. A system for facilitating synchronization of web browsers comprising:

means for conducting a real-time communication session;

means for interacting with a local browser to receive a first uniform resource locator for a first web page initially selected to load by a user of the local browser;

means for forwarding the first uniform resource locator for the first web page across a network to load on a remote browser as pan of the real-time communication session;

means for receiving a second uniform resource locator for a second web page selected by a remote user to load on the remote browser;

means for affecting the load of the second web page after receiving the second uniform resource locator for the second web page;

means for incorporating the first uniform resource locator for the first web page in a first invite message;

wherein said means for forwarding the first uniform resource locator for the first web page across the network comprises means for forwarding the first invite message to a remote computer using session initiation protocol;

wherein said means for receiving the second uniform resource locator for the second web page over the network comprises means for receiving a second invite message from the remote computer; and means for removing the second uniform resource locator for the second web page from the second invite message.

\* \* \* \* \*